United States Patent
Reso et al.

(10) Patent No.: US 10,176,401 B2
(45) Date of Patent: Jan. 8, 2019

(54) METHOD AND APPARATUS FOR GENERATING TEMPORALLY CONSISTENT SUPERPIXELS

(71) Applicant: THOMSON LICENSING, Issy de Moulineaux (FR)

(72) Inventors: Matthias Reso, Hannover (DE); Joern Jachalsky, Wennigsen (DE); Bodo Rosenhahn, Ronnenberg (DE)

(73) Assignee: InterDigital VC Holdings, Inc., Wilmington, DE (US)

(*) Notice: Subject to any disclaimer, the term of this patent is extended or adjusted under 35 U.S.C. 154(b) by 0 days.

(21) Appl. No.: 14/745,424

(22) Filed: Jun. 20, 2015

(65) Prior Publication Data
US 2015/0371113 A1  Dec. 24, 2015

(30) Foreign Application Priority Data

Jun. 20, 2014 (EP) .................................. 14305959
Jul. 28, 2014 (EP) .................................. 14306209

(51) Int. Cl.
| | | |
|---|---|---|
| G06K 9/00 | (2006.01) | |
| G06K 9/62 | (2006.01) | |
| G06K 9/46 | (2006.01) | |
| G06T 7/20 | (2017.01) | |
| G06T 7/12 | (2017.01) | |

(Continued)

(52) U.S. Cl.
CPC ......... *G06K 9/6218* (2013.01); *G06K 9/4604* (2013.01); *G06T 7/12* (2017.01); *G06T 7/174* (2017.01); *G06T 7/187* (2017.01); *G06T 7/20* (2013.01); *G06T 2207/10016* (2013.01)

(58) Field of Classification Search
None
See application file for complete search history.

(56) References Cited

U.S. PATENT DOCUMENTS

| 9,247,129 B1* | 1/2016 | Gray ........................ G06T 7/11 |
| 2005/0141614 A1* | 6/2005 | Braspenning .......... H04N 19/51 |
| | | 375/240.16 |

(Continued)

FOREIGN PATENT DOCUMENTS

| CN | 103067705 | 4/2013 |
| WO | WO2012148619 | 11/2012 |

OTHER PUBLICATIONS

Mester et al. "Multichannel Segmentation Using Contour Relaxation: Fast Super-Pixels and Temporal Propagation" Springer-Verlag Berlin Heidelberg 2011.*

(Continued)

*Primary Examiner* — Oneal R Mistry
(74) *Attorney, Agent, or Firm* — Tutunjian & Bitetto, P.C.

(57) ABSTRACT

A method and an apparatus for generating superpixels for a sequence of images. A cluster assignment generator generates a cluster assignment for a first image of the sequence of images, e.g. by clustering pixels of the first image into superpixels or by retrieving an initial cluster assignment for the first image and processing only contour pixels with regard to their cluster assignment. A label propagator initializes subsequent images based on a label propagation using backward optical flow. A contour pixel processor then processes only contour pixels with regard to their cluster assignment for subsequent images of the sequence of images.

24 Claims, 4 Drawing Sheets

(51) Int. Cl.
G06T 7/174 (2017.01)
G06T 7/187 (2017.01)

(56) References Cited

U.S. PATENT DOCUMENTS

| | | | |
|---|---|---|---|
| 2006/0061582 A1 | 3/2006 | Kurupati et al. | |
| 2007/0092122 A1* | 4/2007 | Xiao | G06T 7/2006 382/128 |
| 2012/0275703 A1* | 11/2012 | Lv | G06T 3/4053 382/173 |
| 2013/0223740 A1 | 8/2013 | Wang et al. | |
| 2014/0063275 A1* | 3/2014 | Krahenbuhl | H04N 19/117 348/208.4 |
| 2014/0071347 A1 | 3/2014 | Chen et al. | |
| 2014/0119656 A1* | 5/2014 | Lilje | G06T 7/0083 382/173 |
| 2014/0254882 A1* | 9/2014 | Jin | G06T 7/204 382/107 |
| 2015/0063709 A1* | 3/2015 | Wang | G06T 7/0083 382/199 |
| 2015/0234863 A1* | 8/2015 | Lilje | G06F 17/30259 382/103 |

OTHER PUBLICATIONS

Achanta etal: "SLIC Superpixels Compared to State-of-the-Art Superpixel Methods"; Journal of Latex Class Files, vol. 6, No. 1, Dec. 2011, pp. 1-8.
Achanta et al.: "SLIC Superpixels"; EPFL Technical Report 149300, Jun. 2010; pp. 1-15.
Arbeláez et al: "Contour detection and hierarchical image segmentation"; TPAMI 33 (MAI 2011); pp. 898-916.
Bergh et al.: "SEEDS: Superpixels Extracted via Energy-Driven Sampling"; in: ECCV. (Oct. 7, 2012); pp. 13-26.
Chang et al.: "A video representation using temporal superpixels"; in: CVPR. (Jun. 23, 2013); pp. 2051-2058.
Chen et al.: "Propagating multi-class pixel labels throughout video frames"; in: WNYIPW. (Nov. 5, 2010); pp. 14-17.
Djelouah et al.: "Multi-view object segmentation in space and time"; in: ICCV. (Dec. 1, 2013); pp. 2640-2647.
Felzenszwalb et al.: "Efficient graph-based image segmentation"; IJCV 59 (Sep. 1, 2004); pp. 167-181.
Galasso et al.: "A unified video segmentation benchmark"—Annotation, metrics and analysis; in: ICCV. (Dec. 1, 2013); pp. 3527-3534.
Galasso et al.: "Video segmentation with superpixels"; in:ACCV. (Nov. 5, 2012); pp. 760-774.
Grundmann et al.: "Efficient hierarchical graph-based video segmentation"; in: CVPR. (Jun. 13, 2010); pp. 2141-2148.
Helala et al.: "Road Boundary Detection in Challenging Scenarios"; Proceedings of the 2012 9th IEEE International Conference on Advanced Video and Signal Based Surveillance (AVSS); Sep. 18, 2012; pp. 1-6.
Hoiem et al.: "Geometric context from a single image"; in:ICCV. (Oct. 17, 2005; pp. 654-661.
Horn et al.: "Determining Optical Flow"; AI 17 (Aug. 1981); pp. 185-203.
Jain et al.: "Coarse-to-Fine Semantic Video Segmentation Using Supervoxel Trees"; in: ICCV. (Dec. 2013); pp. 1865-1872.
Levinshtein et al.: "Spatiotemporal Closure"; in Computer Vision—ACCV 2010, vol. 6492, 2011, pp. 369-382.
Levinshtein et al.: "TurboPixels—Fast Superpixels Using Geometric Flows"; Pattern Analysis and Machine Intelligence, IEEE Transactions on, vol. 31, No. 12, pp. 2290-2297, Dec. 2009

Lezama et al.: "Track to the future—Spatio-temporal video segmentation with long-range motion cues"; in: CVPR. (Jun. 20, 2011); pp. 3369-3376.
Liu: "Beyond pixels: exploring new representations and applications for motion analysis"; PhD thesis, Massachusetts Institute of Technology (Jun. 2009); pp. 1-164.
Lloyd: "Least squares quantization in PCM"; Information Theory, IEEE Transactions on, vol. 28, No. 2, pp. 129-137, Mar. 1, 1982.
Mester et al: "Multichannel Segmentation Using Contour Relaxation: Fast Super-Pixels and Temporal Propagation" in: "Lecture Notes in Computer Science", Jan. 1, 2811 (2811-81-81), vol. 6688, pp. 258-261.
Mikic et al: "Segmentation and Tracking in Echocardiographic Sequences: Active Contours Guided by Optical Flow Estimates",IEEE Transactions on Medical Imaging, vol. 17, No. 2, Apr. 1, 1998 (1998-84-81),pp. 274-284.
Moore et al.: "Superpixel lattices"; presented at the Computer Vision and Pattern Recognition (CVPR), Jun. 23, 2008. IEEE Conference on, 2008, pp. 1-8.
Perbet et al.: "Homogeneous superpixels from random walks"; in: MVA.(Jun. 13, 2011); pp. 26-30.
Ren et al.: "Learning a classification model for segmentation"; presented at the Computer Vision (ICCV), 2003. IEEE International Conference on, Oct. 13, 2003, pp. 10-17.
Reso et al: "Temporally Consistent Superpixels", 2813 IEEE International Conference on Computer Vision, IEEE,Dec. 1, 2813 (2813-12-81), pp. 385-392.
Roig et al.: "Active MAP Inference in CRFs for Efficient Semantic Segmentation"; in: ICCV. (Dec. 2013); pp. 2312-2319.
Schick et al.: "Measuring and Evaluating the Compactness of Superpixels"; presented at the Pattern Recognition (ICPR), 2012. International Conference on, Nov. 11, 2012, pp. 1-5.
Sundberg et al.: "Occlusion boundary detection and figure/ground assignment from optical flow"; in: CVPR. (Jun. 20, 2011); pp. 2233-2240.
Tighe et al.: "SuperParsing—Scalable Nonparametric Image Parsing with Superpixels"; IJCV 101 (2012); pp. 329-349.
Krim (UNAL) et al: (Cited in the EP Search Report as Krim et al.): "Fast Incorporation of Optical Flow Into Active Polygons",IEEE Transactions on Image Processing, vol. 14, No. 6, Jun. 1, 2005 (Jun. 1, 2005),pp. 745-759.
Van Den Bergh etal:"Online video SEEDS for temporal window objectness"; in: ICCV. (Dec. 2013); pp. 377-384.
Van Den Bergh et al.: "Real-time stereo and flow-based video segmentation with superpixels"; presented at the Applications of Computer Vision (WACV), 2012 IEEE Workshop on, Jan. 9, 2012, pp. 89-96.
Van Den Hengel et al.: "VideoTrace—rapid interactive scene modelling from video"; ACM TOG; vol. 26 (Jul. 2007); article 86; No. 3, pp. 1-6.
Veksler et al.: "Superpixels and Supervoxels in an Energy Optimization Framework"; in Computer Vision—ECCV 2010, vol. 6315, Sep. 5, 2010, pp. 211-224.
Vogel et al.: "Piecewise Rigid Scene Flow"; in: ICCV. (Dec. 2013); pp. 1377-1384.
Wang et al.: "Superpixel tracking"; in: ICCV. (Nov. 6, 2011); pp. 1323-1330.
Xu et al.: "Evaluation of super-voxel methods for early video processing"; in: CVPR. (Jun. 16, 2012); pp. 1202-1209.
Xu et al.: "Streaming hierarchical video segmentation"; in: ECCV. (Oct. 7, 2012); pp. 626-639.
Zhang et al.: "Estimating the 3D Layout of Indoor Scenes and Its Clutter from Depth Sensors"; in: ICCV. (Dec. 2013); pp. 1273-1280.
Zhong et al.: "Long-Term Moving Object Segmentation and Tracking Using Spatio-Temporal Consistency"; Image Processing, 2001. Proceedings. 2001 International Conference on Jul. 10, 2001 (vol. 2 ) pp. 57-60 vol. 2.
Search Report dated Jan. 13, 2015.

* cited by examiner (a) (b) (c)

METHOD AND APPARATUS FOR GENERATING TEMPORALLY CONSISTENT SUPERPIXELS

This application claims the benefit, under 35 U.S.C. § 119 of European Patent Application No. 14305959.0, filed Jun. 20, 2014 and European Patent Application No. 14306209.9, filed Jul. 29, 2014.

FIELD OF THE INVENTION

The present invention relates to a method and an apparatus for generating temporally consistent superpixels for a video sequence. More specifically, a method and an apparatus for generating temporally consistent superpixels are described, which make use of contour evolution.

BACKGROUND OF THE INVENTION

Superpixel algorithms represent a very useful and increasingly popular preprocessing step for a wide range of computer vision applications, such as video segmentation, tracking, multi-view object segmentation, scene flow, 3D layout estimation of indoor scenes, interactive scene modeling, image parsing, and semantic segmentation. Grouping similar pixels into so called superpixels leads to a major reduction of the image primitives. This results in an increased computational efficiency for subsequent processing steps, allows for more complex algorithms computationally infeasible on pixel level, and creates a spatial support for region-based features.

Superpixel algorithms group pixels into superpixels. As indicated in [1], superpixels are local, coherent, and preserve most of the structure necessary for segmentation at the scale of interest. Superpixels should be roughly homogeneous in size and shape. Though many superpixel approaches mostly target still images and thus provide only a limited or no temporal consistency at all when applied on video sequences, some approaches target video sequences [2][3]. These approaches start to deal with the issue of temporal consistency.

The superpixel generation in itself does not necessarily lead to spatially coherent superpixels. Thus, a post-processing step is required to ensure the spatial connectivity of the pixels comprised in the clusters and thus the superpixels. In addition, in [4] it was stated that the post-processing method proposed in [5] assigns the isolated superpixel fragments to arbitrary neighboring superpixels without considering any similarity measure between the fragments and the superpixels they are assigned to. Contour evolution approaches as proposed in [4] can overcome this drawback, often at the cost of a high number of iterations. In addition, they often focus on still images and thus leave the temporal consistency issue unsolved.

SUMMARY OF THE INVENTION

It is an object of the present invention to propose an improved solution for generating temporally consistent superpixels associated to images of a sequence of images.

According to the invention, a method for generating temporally consistent superpixels for a sequence of images comprises:
  generating a cluster assignment for a first image of the sequence of images;
  initializing subsequent images based on a label propagation using backward optical flow; and
  for subsequent images of the sequence of images, processing only contour pixels with regard to their cluster assignment.

Accordingly, an apparatus configured to generate temporally consistent superpixels for a sequence of images comprises:
  a cluster assignment generator configured to generate a cluster assignment for a first image of the sequence of images;
  a label propagator configured to initialize subsequent images based on a label propagation using backward optical flow; and
  a contour pixel processor configured to process only contour pixels with regard to their cluster assignment for subsequent images of the sequence of images.

Also, a computer readable storage medium has stored therein instructions enabling generating temporally consistent superpixels for a sequence of images, wherein the instructions, when executed by a computer, cause the computer to:
  generate a cluster assignment for a first image of the sequence of images;
  initialize subsequent images based on a label propagation using backward optical flow; and
  for subsequent images of the sequence of images, process only contour pixels with regard to their cluster assignment.

Furthermore, a computer program comprises instructions enabling generating temporally consistent superpixels for a sequence of images, which when executed by a computer, cause the computer to:
  generate a cluster assignment for a first image of the sequence of images;
  initialize subsequent images based on a label propagation using backward optical flow; and
  for subsequent images of the sequence of images, process only contour pixels with regard to their cluster assignment.

The proposed solution introduces a contour evolution-based strategy for the clustering-based superpixel approach described in [6]. Instead of processing all pixels in the video volume during the clustering only the contour pixels are processed. Therefore, in each iteration only the contour pixels can be changed, i.e. assigned to a different cluster. The other pixels keep their previous assignment. New images entering the video volume are initialized by propagating the contours of the latest image utilizing backward flow information.

In one embodiment, generating the cluster assignment for the first image of the sequence of images comprises clustering pixels of the first image into superpixels.

In another embodiment, generating the cluster assignment for the first image of the sequence of images comprises retrieving an initial cluster assignment for the first image and processing only contour pixels with regard to their cluster assignment. The initial cluster assignment for the first image is created by the tessellation of the image using geometric shapes, which can be e.g. squares, rectangles or hexagons. All pixels covered by the same shape are assigned to the same cluster. This finally results into the initial cluster assignment.

A fully contour-based approach for superpixels on video sequences is proposed, which is expressed in an expectation-maximization (EM) framework, and generates superpixels that are spatially coherent and temporally consistent. An efficient label propagation using backward optical flow encourages the preservation of superpixel shapes when appropriate.

With the proposed approach in general no post-processing step is required to ensure spatial coherency after the clustering. At the same time the generated superpixels show a high boundary/contour accuracy and a high temporal consistency. In addition, the approach works reasonably fast due to selective processing. The generated superpixels are beneficial for a wide range of computer vision applications, ranging from segmentation, image parsing to classification etc.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

Figure 1:
FIG. 1 shows an example of superpixels with temporal consistency.
Figure 1:
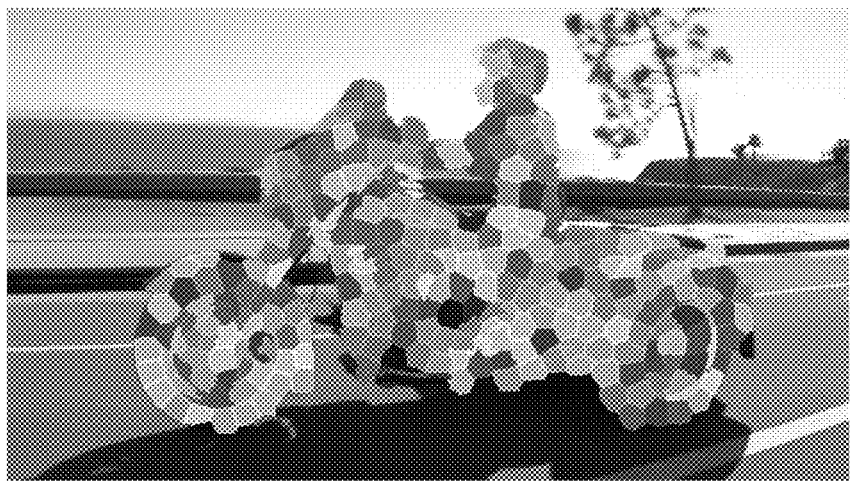
Figure 1:
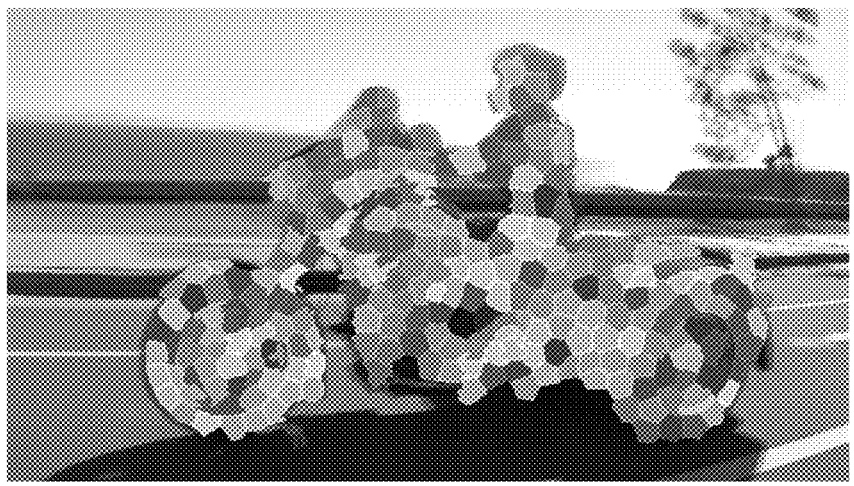

FIG. 1 shows an example of superpixels with temporal consistency. While FIG. 1(a) depicts the original image, in FIG. 1(b) a full segmentation of the video was performed and a subset of superpixels was manually selected in one image and provided with grey values for visualization. FIG. 1(c) shows the same subset after several images. The same grey value means temporal connectedness.

For a better understanding of the main idea, in the following the contour evolution-based approach is first briefly described for still images and then extended to video using a slightly different explanatory approach.
Short Brief Description for Still Images For clustering-based approaches, pixels of an image are seen as data points in a multi-dimensional feature space, in which each dimension corresponds to a color channel or image coordinate of the pixels. Superpixels are represented by clusters in this multi-dimensional feature space and each data point can only be assigned to one cluster. This assignment finally determines the over-segmentation and thus the superpixel generation.

In order to find an optimal solution for this assignment problem using a fully contour evolution-based approach, an energy function $E_{total}$ is defined, which sums up the energy $E(n,k)$ that is needed to assign a contour pixel $n \in \mathcal{N}_c$ to a cluster $k \in \mathcal{K}_n$:

$$E_{total} = \sum_{n \in \mathcal{N}_c} E(n, k),$$

where $\mathcal{N}_c$ is the set of contour pixels in the image and $\mathcal{K}_n$ is the set of clusters that are adjacent to the contour pixel n and to the cluster to which the contour pixel n is assigned. The energy $E(n,k)$ can be further refined as the weighted sum of a color-difference related energy $E_c(n,k)$ and a spatial-distance-related energy $E_s(n,k)$:

$$E(n,k)=(1-\alpha)E_c(n,k)+\alpha E_s(n,k).$$

The energy $E_c(n,k)$ is directly proportional to the Euclidean distances between the contour pixel n and the color center of cluster k in the chosen color space. Likewise, $E_s(n,k)$ is proportional to the Euclidean distance of the spatial position of n and the spatial position of the center of cluster k. In order to make the results independent from the image size, the spatial distance is scaled with the factor $1/\sqrt{|\mathcal{N}|/|\mathcal{K}|}$, where $|\cdot|$ is the number of elements in a set, $\mathcal{N}$ the set of all pixels in the image and $\mathcal{K}$ the set of all clusters in the image. With the parameter α the user can steer the segmentation results to be more compact or more sensitive to fine-grained image structures. For a given number of clusters $|\mathcal{K}|$ and a user-defined α, an optimal over-segmentation in terms of energy can be determined by finding a constellation of clusters that minimizes $E_{total}$.

The assignment problem is solved by applying an iterative Lloyd's algorithm, which converges to a locally optimal solution. The clusters are initialized as evenly distributed, non-overlapping rectangles or squares, for example, in the spatial subspace. To minimize the energy term $E_{total}$ the algorithm iterates two alternating steps, the assignment-step and the update-step. In the assignment-step, each contour pixel n is assigned to the cluster $k \in \mathcal{K}_n$, for which the energy term $E(n,k)$ has its minimum given the set $\mathcal{K}_n$. The other pixels that are not contour pixels keep their assignments. Based on the assignments, the parameters of the cluster centers are re-estimated in the update-step by calculating the mean color and mean position of their assigned pixels. The iteration stops when no changes in the assignment-step are detected or a maximum number of iterations have been performed.

A contour pixel n is a pixel with at least one adjacent pixel that is assigned to a different cluster. The set of all contour pixels $\mathcal{N}_c$ is a (small) subset of the set $\mathcal{N}$. The cluster the contour pixel n is assigned to and all clusters of the adjacent pixels, which are assigned to a different cluster than n, form the set $\mathcal{K}_n$.

In order to minimize the bias caused by a constant scan-order used to traverse the image in the assignment step, it should be changed with each iteration. Possible scan-orders are, for example, left-to-right and top-to-bottom, right-to-left and top-to-bottom, left-to-right and bottom-to-top, right-to-left and bottom-to-top.

As $\mathcal{N}_c$ and $\mathcal{K}_n$ (and not $\mathcal{N}$ and $\mathcal{K}$) are taken into consideration to determine $E_{total}$, the processing load is significantly reduced.
Approach for Videos As indicated in the beginning, superpixel algorithms group spatially coherent pixels that share the same low-level features as e.g. color or texture into small segments of approximately same size and shape. Therefore, one important and inherent constraint is that the boundaries of the superpixels should comply with the main object boundaries present in the image. This capturing of the main object boundaries is rather important for image or video segmentation built upon the initial superpixel segmentation. Moreover, for a superpixel segmentation on video content it is necessary to capture the temporal connections between superpixels in successive images in order to achieve a consistent labeling that can be leveraged for applications like tracking or video segmentation.

As mentioned before, the approach described here extends the approach described in [6], entitled Temporally Consistent Superpixels (TCS). For a better understanding the main ideas of TCS shall be shortly summarized in the following, In general, TCS performs an energy-minimizing clustering on a video volume utilizing a hybrid clustering strategy for a multi-dimensional feature space, which is separated into a global color subspace and multiple local spatial subspaces.

More specifically, the energy-minimizing framework used in TCS clusters pixels based on their five dimensional feature vector [labxy], which contains the three color values [lab] in CIE-Lab-color space and the pixels coordinates [xy]. In order to capture the temporal connections between superpixels in successive images, the clustering is performed over an observation window spanning K images. The separated feature space is realized in the following way. Each cluster center representing one temporal superpixel consists of one color center for the complete observation window and multiple spatial centers with one for each image in the observation window. The underlying assumption is that a temporal superpixel should share the same color in successive images but not necessarily the same position.

For the observation window that is shifted along the timeline an optimal set of cluster centers $\Theta_{opt}$ as well as a mapping $\sigma_{opt}$ of the pixels inside the observation window to these cluster centers are obtained. Therefore, an energy function is defined, which sums up the energies necessary to assign a pixel at position x,y in image k to a cluster center $\theta \in \Theta_{opt}$. This assignment or mapping is here denoted by $\sigma_{x,y,k}$.

$$E_{total} = \sum_k \sum_{x,y} (1-\alpha) E_c(x, y, k, \sigma_{x,y,k}) + \alpha E_s(x, y, k, \sigma_{x,y,k}).$$

The energy needed for an assignment is the weighted sum of a color dependent energy $E_c(x,y,k,\sigma_{x,y,k})$ and a spatial energy $E_s(x,y,k,\sigma_{x,y,k})$. Both energy terms are proportional to the Euclidean distance in color space and image plane, respectively. The trade-off between color-sensitivity and spatial compactness is controlled by a weighting factor $\alpha$, which has a range between 0 (fully color-sensitive) and 1 (fully compact). The energy function is minimized using an iterative optimization scheme, which can be viewed as an expectation-maximization (EM) approach.

In the E-step (Expectation-step) of iteration l+1 a new estimation of the optimal mapping, here denoted as $\hat{\sigma}_{x,y,k}^{l+1}$, is determined, which minimizes $E_{total}$ based on the estimation of the optimal set of cluster center $\hat{\Theta}_{opt}^{l}$ calculated in the M-step (Maximization-step) of iteration l.

After that, the estimation of the optimal cluster set $\hat{\Theta}_{opt}^{l+1}$ is updated in the M-step of iteration l+1 given the updated mapping by calculating the mean color and mean spatial values of the assigned pixels. The alternation of the two steps continues until the energy $E_{total}$ drops below a specific bound or a fixed number of iterations is performed. In the hybrid clustering proposed for TCS, only the $K_F < K$ most future images in the observation window are reassigned during the optimization. For the remaining $K-K_F$ images the determined mapping is kept in order to preserve the color clustering found.

The observation window is shifted along the video volume and new images entering the observation window are initialized as described in more detail below. To ensure the spatial coherency of the generated temporally consistent superpixels a contour-based post processing step is applied.

Revisiting the ideas of TCS, the following two observations were made: (a) In order to achieve a higher run-time performance, the initial energy-minimizing cluster and the contour-based post processing are separated steps. (b) New images added to the observation window are initialized by projecting only the spatial centers of the preceding image into the new image. As a consequence the shape information obtained in the images before is at least partially discarded.

In contrast to TCS, the energy function $E_{total}$ for the proposed approach is only optimized for pixels at a contour (or boundary) of a superpixel, so called contour pixels. A contour pixel at position x,y has at least one pixel in its 4-connected neighborhood $\mathcal{N}_{x,y}^4$, which is assigned to a different cluster, i.e. a temporal superpixel, or is unassigned. The occurrence of unassigned pixels and their handling is described in detail below. Moreover, the assignment of a contour pixel can only be changed to one of the clusters of the pixels in $\mathcal{N}_{x,y}^4$. The E-step of the optimization is expressed as $$\hat{\sigma}_{x,y,k}^{l+1} = \underset{\hat{\sigma}_{\tilde{x},\tilde{y},k}^{l}: \tilde{x},\tilde{y} \in \mathcal{N}_{x,y}^4}{\operatorname{argmin}} (1-\alpha) E_c(x,y,k,\hat{\sigma}_{\tilde{x},\tilde{y},k}^{l}) + \alpha E_s(x,y,k,\hat{\sigma}_{\tilde{x},\tilde{y},k}^{l}) \forall x,$$

$$y \in C_k^l.$$

where $C_k^l$ is the set of contour pixels after iteration step l in frame k. The optimization is done for the $K_F$ most future images in the observation window. The M-step remains unmodified. The optimization can be terminated if there are no further assignment changes for the contour pixels or if a maximum number of iterations has been reached.

Figure 2:
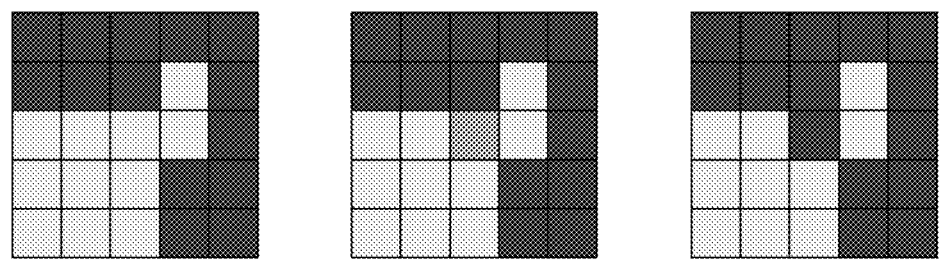
FIG. 2 shows a 5×5 pixel-neighborhood between two superpixels.

In addition to the description above, there are two constraints. First, an assignment change is only done if the spatial coherency of the superpixels is guaranteed. This constraint prevents that fragments of a temporal superpixel are split-off during the optimization, as shown in FIG. 2. The three subfigures show a 5×5 pixel-neighborhood between two superpixels (light grey and dark grey). If the centered pixel (medium grey in (b)) changes its assignment, the two pixels on its right lose connection to the light grey superpixel and thus they would be split-off from the main mass (as shown exemplarily in (c)). Therefore, no assignment change is performed in situations like these.

Second, if a contour pixel is unassigned, it is assigned to the cluster of one of its adjacent pixels based on $\hat{\sigma}_{x,y,k}^{l+1}$. As a consequence, the additional post-processing step required in TCS to ensure the spatial coherency is not needed anymore and can be omitted. Although especially the first constraint limits to some extent the flexibility of how the temporal superpixels can adapt to the video content, experiments have proven that it does not have a negative impact on the segmentation accuracy.

As mentioned above, TCS initializes new images only by projecting the spatial centers into a new image entering the observation window. Therefore, the weighted average of the dense optical flow determined over all pixels assigned to a cluster is used for the projection. Especially for image areas with a homogeneous color or structure, this can lead to an unsteady positioning of the superpixels from image to image. Depending on the application relying on the superpixel segmentation this could be an unwanted effect. In order to overcome this problem, one solution is to transfer the shape of the superpixels to the new image to be initialized. This helps to preserve the shape information as well as the superpixel constellation obtained in previous images, as it is at least the starting for the next optimization in the EM framework.

Figure 3:
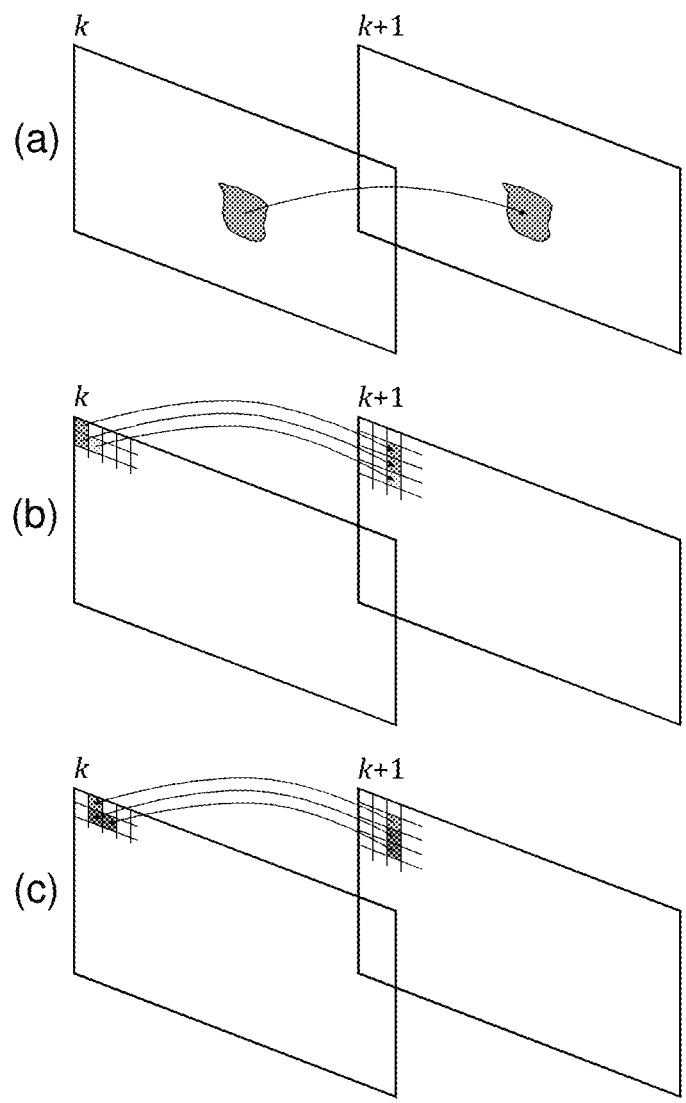
FIG. 3 illustrates possible variations of superpixel label propagation to new frames.
Figure 4:
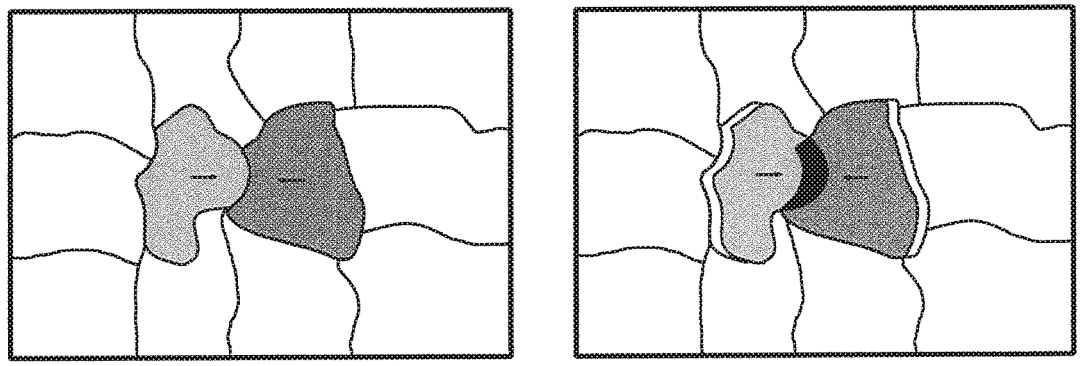
FIG. 4 explains problems occurring when propagating whole superpixels by mean optical flow.

There are several ways to realize such an initialization of the new images. One is the shift of the complete superpixel label using the mean optical flow, as depicted in FIG. 3(a). An alternative is the usage of a dense optical flow predicted for each pixel of the superpixel. Thus, the superpixel label is projected into the new image as shown in FIG. 3(b). These two options have the following drawback: If two superpixels projected into the new image overlap, it is at least necessary to detect this collision. In addition, it is possible that there are unassigned parts in the image that have to be initialized, e.g. if adjacent superpixels are projected away from each other. Both cases are illustrated in FIG. 4, which shows a ripped open superpixel label (light grey stripes) and overlapping areas (black), and apply in the same manner to the shifting of pixels by a dense optical flow.

In order to circumvent these problems, it is proposed to use a dense optical backward flow, which is computed from the image entering the observation window k+1 to the preceding image k in the window. This approach is shown in FIG. 3(c). Rounding the optical backward flow components u and v to the nearest integer for the horizontal and vertical direction and clipping components pointing outside the valid image area, the initial mapping of pixels to cluster centers of the new image k+1 denoted as $\hat{\sigma}_{x,y,k+1}^{init}$ can be deduced from the previous mapping after L iterations of image k as follows:

$$\hat{\sigma}_{x,y,k+1}^{init} = \hat{\sigma}_{x+u,y+v,k}^{L}.$$

This approach solves the problem mentioned above and leads to an unambiguous label for each pixel. The only issue left, which also exists for the forward optical flow, is that the projected superpixels can be fragmented, i.e. they are not spatially coherent. In the case, in which a superpixel is fragmented, the largest fragment is determined and the other fragments are set to unassigned and are handled in the E-step of the optimization as they are part of the contour pixels.

In [6] a heuristic was introduced to encounter structural changes in the video volume, which are e.g. occlusions, disocclusions, and objects approaching the camera as well as zooming. The decision to split or terminate a temporal superpixel was made based on a linear growth assumption of the superpixel size. Additionally, a separate balancing step was performed to keep the number of superpixels per frame constant. In order to simplify the treatment of the superpixels, these two steps are replaced with a single one by introducing an upper and lower bound for the superpixel size. Superpixels that are larger than the upper bound after the optimization are split and the ones that are smaller than the lower bound after the optimization are terminated. Therefore, these bounds are coupled to the number of superpixels initially specified by the user. Thus, the user defines a minimum and maximum number of superpixels per image $N_{min}$ and $N_{max}$, respectively. Based on that, the upper and lower bound $A_{low}$ and $A_{up}$ are derived as follows $$A_{low} = \frac{|P|}{N_{max}} \text{ and } A_{up} = \frac{|P|}{N_{min}}$$

where |P| is the number of pixels per image. In the present implementation a number of superpixels is specified as N and $N_{min}$ and $N_{max}$ are set to ½N and 2N, respectively.

To summarize the proposed approach, the hybrid clustering scheme is extended to process in the assignment step only contour pixels in the mutable images of the sliding window. The mutable images of the sliding window are the current image and the future images.

New images that enter the sliding window are initialized in the following way. Between the new image that is to enter the sliding window and the latest image in the sliding window the backward flow is computed. Based on this backward flow for each pixel in the new image the corresponding pixel in the latest image is determined. Then, each pixel in the new image is assigned to the same cluster the corresponding pixel in the latest image is assigned to. The only issue left is that the projected superpixels can be fragmented, i.e. they are not spatially coherent. In the case of a fragmented superpixel the largest fragment is determined and the pixels belonging to the other fragments are set to unassigned. The unassigned pixels are handled in the E-step of the optimization.

Assignment changes are only done if the spatial coherency of the superpixels is guaranteed, which prevents that fragments of a temporal superpixel are split-off during the optimization. In addition, any unassigned contour pixel is assigned to the cluster of one of its adjacent pixels. As a consequence, no additional post-processing step is required to ensure the spatial coherency.

The contour evolution-based clustering on the video volume including the contour propagation for the initialization leads to a high temporal consistency and a high boundary/contour accuracy, even on datasets with different kinds of camera movement, non-rigid motion, and motion blur. Moreover, due to the selective processing (only contour pixels are processed during the assignment step) a competitive run-time performance is achieved.

Figure 5:
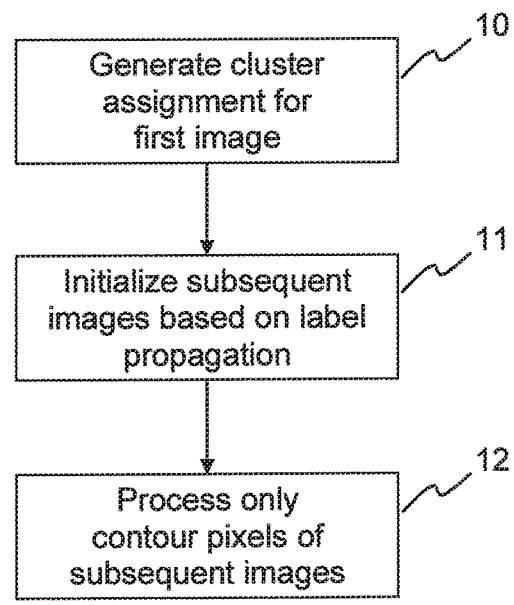
FIG. 5 schematically illustrates a method according to the invention.

A method according to the invention for generating temporally consistent superpixels for a sequence of images is schematically illustrated in FIG. 5. In a first step a cluster assignment is generated 10 for a first image of the sequence of images, e.g. by clustering pixels of the first image into superpixels or by retrieving an initial cluster assignment for the first image and processing only contour pixels with regard to their cluster assignment. Subsequent images are initialized 11 based on a label propagation using backward optical flow. Then, for subsequent images of the sequence of images, only contour pixels are processed 12 with regard to their cluster assignment.

Figure 6:
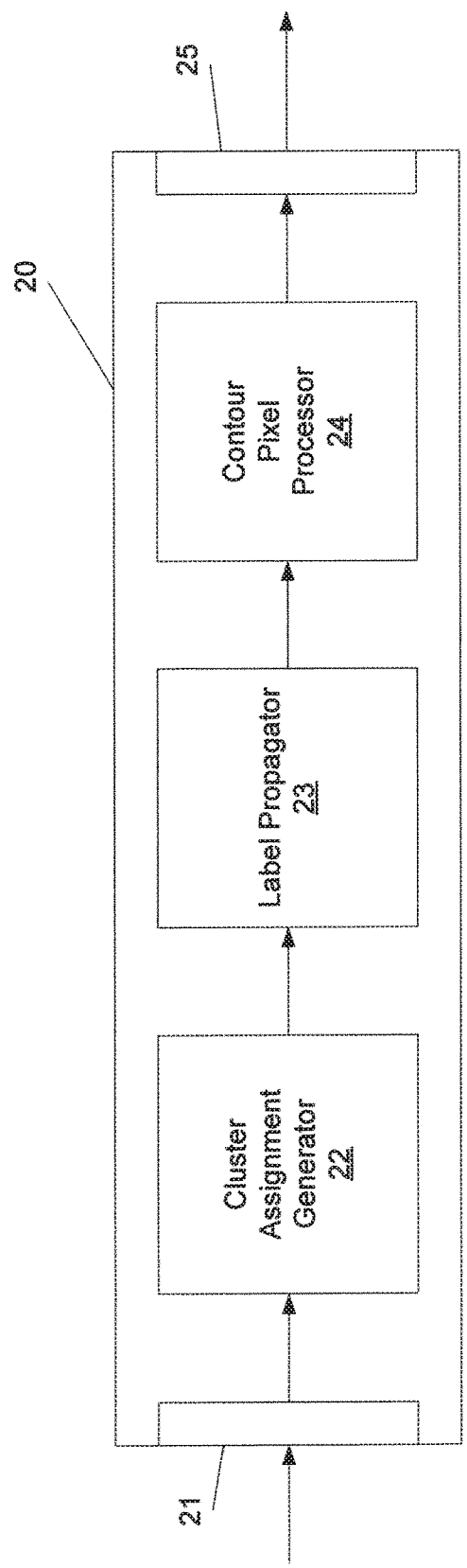
FIG. 6 schematically illustrates an apparatus configured to perform a method according to the invention.

FIG. 6 schematically illustrates an apparatus 20 according to the invention for generating temporally consistent superpixels for a sequence of images. The apparatus 20 comprises an input 21 for receiving a sequence of images. A cluster assignment generator 22 generates 10 a cluster assignment for a first image of the sequence of images, e.g. by clustering pixels of the first image into superpixels or by retrieving an initial cluster assignment for the first image and processing only contour pixels with regard to their cluster assignment. A label propagator 23 initializes 11 subsequent images based on a label propagation using backward optical flow. A contour pixel processor 24 then processes 12 only contour pixels with regard to their cluster assignment for subsequent images of the sequence of images. The resulting superpixels are preferably made available at an output 25. Of course, the different units 22, 23, 24 of the apparatus 20 may likewise be fully or partially combined into a single unit or implemented as software running on a processor. Also, the input 21 and the output 25 can likewise form a single bi-directional interface.

REFERENCES

[1] X. Ren et al.: "*Learning a classification model for segmentation*", 2003 IEEE International Conference on Computer Vision (ICCV), pp. 10-17.
[2] O. Veksler et al.: "*Superpixels and Supervoxels in an Energy Optimization Framework*", Proceedings of the 11th European conference on Computer vision: Part V (ECCV'10) (2010), pp. 211-224.
[3] A. Levinshtein et al.: "*Spatiotemporal Closure*", Proceedings of the 10th Asian conference on Computer vision: Part I (ACCV'10) (2010), pp. 369-382.
[4] A. Schick et al.: "*Measuring and Evaluating the Compactness of Superpixels*", 21st International Conference on Pattern Recognition (ICPR) (2012), pp. 930-934.
[5] R. Achanta et al.: "*SLIC superpixels compared to state-of-the-art superpixel methods*", IEEE Transactions on Pattern Analysis and Machine Intelligence, Vol. 34 (2012), pp. 2274-2282.
[6] M. Reso et al.: "*Temporally Consistent Superpixels*", 2013 IEEE International Conference on Computer Vision (ICCV), pp. 385-392.

The invention claimed is:

1. A method for generating temporally consistent superpixels for a sequence of images to increase computational efficiency for further processing or deployment of the superpixels, the method comprising:
generating, by at least one processor, a cluster assignment for a first image of the sequence of images, a cluster representing a superpixel for said first image;
initializing, by said at least one processor, subsequent images of the sequence of images based on a superpixel label propagation from one image to the next using a dense backward optical flow providing an unambiguous label for each pixel, the dense backward optical flow being used to compute a mapping of pixels to cluster centers of a given one of the subsequent images entering a given observation window based on a mapping of of preceding image in a preceding observation window; and
for said subsequent images of the sequence of images, processing, by said at least one processor, only contour pixels with regard to their cluster assignment, each of said contour pixels being a pixel with at least one adjacent pixel that is assigned to a different cluster; and
outputting, by said at least one processor, the superpixel for further processing or deployment.

2. The method according to claim 1, wherein generating the cluster assignment for the first image of the sequence of images further comprises clustering pixels of the first image into superpixels.

3. The method according to claim 1, wherein generating the cluster assignment for the first image of the sequence of images further comprises retrieving an initial cluster assignment for the first image and processing only contour pixels with regard to their cluster assignment.

4. The method according to claim 1, wherein an assignment change of a pixel is only done if a spatial coherency of the superpixels is guaranteed.

5. The method according to claim 1, wherein in case of fragmentation of a superpixel, a largest fragment of the superpixel is determined and pixels belonging to remaining fragments of the superpixel are set to unassigned.

6. The method according to claim 4, wherein any unassigned pixel is assigned to the cluster of one of its adjacent pixels.

7. The method according to claim 1, further comprising splitting by said at least one processor superpixels that are larger than an upper bound and terminating superpixels that are smaller than a lower bound.

8. The method according to claim 7, wherein the upper bound and the lower bound are determined from the number of pixels per image and a minimum and a maximum number of superpixels per image, respectively.

9. An apparatus configured to generate temporally consistent superpixels for a sequence of images to increase computational efficiency for further processing or deployment of the superpixels, wherein the apparatus comprises at least one processor configured to:
generate a cluster assignment for a first image of the sequence of images, a cluster representing a superpixel for said first image;
initialize subsequent images of the sequence of images based on a superpixel label propagation from one image to the next using a dense backward optical flow providing an unambiguous label for each pixel, the dense backward optical flow being used to compute a mapping of pixels to cluster centers of a given one of the subsequent images entering a given observation window based on a mapping of preceding image in a preceding observation window;
process only contour pixels with regard to their cluster assignment for said subsequent images of the sequence of images, each of said contour pixels being a pixel with at least one adjacent pixel that is assigned to a different cluster; and
output the superpixel for further processing or deployment.

10. A non-transitory computer readable storage medium having stored therein instructions enabling generating temporally consistent superpixels for a sequence of images to increase computational efficiency for further processing or deployment of the superpixels, wherein the instructions, when executed by a computer, cause the computer to:
generate a cluster assignment for a first image of the sequence of images a cluster representing a superpixel for said first image;
initialize subsequent images of the sequence of images based on a superpixel label propagation from one image to the next using a dense backward optical flow providing an unambiguous label for each pixel, the dense backward optical flow being used to compute a mapping of pixels to cluster centers of a given one of the subsequent images entering a given observation window based on a mapping of receding image in a preceding observation window;
for said subsequent images of the sequence of images, process only contour pixels with regard to their cluster assignment, each of said contour pixels being a pixel with at least one adjacent pixel that is assigned to a different cluster; and
output the superpixel for further processing or deployment.

11. The apparatus according to claim 9, wherein the at least one processor is further configured to generate the cluster assignment for the first image of the sequence of images by clustering pixels of the first image into superpixels.

12. The apparatus according to claim 9, wherein the at least one processor is further configured to generate the cluster assignment for the first image of the sequence of images by retrieving an initial cluster assignment for the first image and processing only contour pixels with regard to their cluster assignment.

13. The apparatus according to claim 9, wherein the at least one processor is further configured to only do an assignment change of a pixel if the spatial coherency of the superpixels is guaranteed.

14. The apparatus according to claim 9, wherein the at least one processor is further configured to, in case of fragmentation of a superpixel, determine the largest fragment of the superpixel and set pixels belonging to the remaining fragments of the superpixel to unassigned.

15. The apparatus according to claim 13, wherein the at least one processor is further configured to assign any unassigned pixel to the cluster of one of its adjacent pixels.

16. The apparatus according to claim 9, wherein the at least one processor is further configured to split superpixels that are larger than an upper bound and to terminate superpixels that are smaller than a lower bound.

17. The apparatus according to claim 16, wherein the at least one processor is further configured to determine the upper bound and the lower bound from the number of pixels per image and a minimum and a maximum number of superpixels per image, respectively.

18. The non-transitory computer readable storage medium according to claim 10, wherein the instructions cause the computer to generate the cluster assignment for the first image of the sequence of images by clustering pixels of the first image into superpixels.

19. The non-transitory computer readable storage medium according to claim 10, wherein the instructions cause the computer to generate the cluster assignment for the first image of the sequence of images by retrieving an initial cluster assignment for the first image and processing only contour pixels with regard to their cluster assignment.

20. The non-transitory computer readable storage medium according to claim 10, wherein the instructions cause the computer to only do an assignment change of a pixel if the spatial coherency of the superpixels is guaranteed.

21. The non-transitory computer readable storage medium according to claim 10, wherein the instructions cause the computer to, in case of fragmentation of a superpixel, determine the largest fragment of the superpixel and to set pixels belonging to the remaining fragments of the superpixel to unassigned.

22. The non-transitory computer readable storage medium according to claim 20, wherein the instructions cause the computer to assign any unassigned pixel to the cluster of one of its adjacent pixels.

23. The non-transitory computer readable storage medium according to claim 10, wherein the instructions cause the computer to split superpixels that are larger than an upper bound and to terminate superpixels that are smaller than a lower bound.

24. The non-transitory computer readable storage medium according to claim 23, wherein the instructions cause the computer to determine the upper bound and the lower bound from the number of pixels per image and a minimum and a maximum number of superpixels per image, respectively.

* * * * *